(12) United States Patent
Yun

(10) Patent No.: US 11,622,145 B2
(45) Date of Patent: Apr. 4, 2023

(54) DISPLAY DEVICE AND METHOD, AND ADVERTISEMENT SERVER

(71) Applicant: SAMSUNG ELECTRONICS CO., LTD., Suwon-si (KR)

(72) Inventor: Byoung Ho Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/246,195

(22) Filed: Apr. 30, 2021

(65) Prior Publication Data

US 2021/0258628 A1  Aug. 19, 2021

Related U.S. Application Data

(63) Continuation of application No. 16/481,570, filed as application No. PCT/KR2018/001893 on Feb. 13, 2018, now abandoned.

(30) Foreign Application Priority Data

Feb. 14, 2017  (KR) .................. 10-2017-0020199

(51) Int. Cl.
*H04N 21/422* (2011.01)
*H04N 21/45* (2011.01)
(Continued)

(52) U.S. Cl.
CPC ....... *H04N 21/422* (2013.01); *H04N 21/4508* (2013.01); *H04N 21/4532* (2013.01); *H04N 21/472* (2013.01); *H04N 21/812* (2013.01)

(58) Field of Classification Search
CPC ............. H04N 21/422; H04N 21/4532; H04N 21/472; H04N 21/812
See application file for complete search history.

(56) References Cited

U.S. PATENT DOCUMENTS 8,639,826 B2  1/2014 Slothouber et al.
8,849,063 B2  9/2014 Takahashi et al.
(Continued)

FOREIGN PATENT DOCUMENTS

JP  2012-10117  1/2012
KR  10-1140430  4/2012
(Continued)

OTHER PUBLICATIONS

International Search Report for PCT/KR2018/001893, dated Jun. 7, 2018, 5 pages.
(Continued)

*Primary Examiner* — Yassin Alata
(74) *Attorney, Agent, or Firm* — Nixon & Vanderhye, P.C.

(57) ABSTRACT

Disclosed are a display device and method and an advertisement sever. According to an embodiment, the display device includes a display, a communication circuit that communicates with an external electronic device, an interface circuit that receives a user input, and a processor that transmits input device information for the at least one input device to the external electronic device via the communication circuit, receives a first image for interfacing with a user through a most frequently used or most recently used input device among the at least one input device, and overlays the first image on the content, wherein the one input device is the most frequently used input device or the most recently used input device among the identified input devices.

16 Claims, 12 Drawing Sheets

(51) Int. Cl.
*H04N 21/472* (2011.01)
*H04N 21/81* (2011.01)

(56) References Cited

U.S. PATENT DOCUMENTS

| | | | |
|---|---|---|---|
| 2008/0109307 A1* | 5/2008 | Ullah | H04N 21/25891 705/14.66 |
| 2008/0276270 A1 | 11/2008 | Kotaru et al. | |
| 2008/0281583 A1 | 11/2008 | Slothouber et al. | |
| 2008/0281974 A1 | 11/2008 | Slothouber et al. | |
| 2010/0023965 A1 | 1/2010 | Malik | |
| 2011/0321084 A1 | 12/2011 | Takahashi et al. | |
| 2014/0047465 A1 | 2/2014 | Zaslavsky et al. | |
| 2014/0111690 A1 | 4/2014 | Kim et al. | |
| 2015/0304717 A1 | 10/2015 | Kim et al. | |
| 2016/0006971 A1 | 1/2016 | Yum | |
| 2019/0149880 A1 | 5/2019 | Kim et al. | |

FOREIGN PATENT DOCUMENTS

| | | |
|---|---|---|
| KR | 10-1528586 | 6/2015 |
| KR | 10-1532593 | 6/2015 |
| KR | 10-1567832 | 11/2015 |
| KR | 10-2016-0003400 | 1/2016 |
| KR | 10-2016-0011124 | 1/2016 |

OTHER PUBLICATIONS

Written Opinion of the ISA for PCT/KR2018/001893, dated Jun. 7, 2018, 7 pages.
Yun, U.S. Appl. No. 16/481,570, filed Jul. 29, 2019.
Office Action dated Jan. 4, 2023 Korean Application No. 10-2017-0020199 and English-language translation.

* cited by examiner

DISPLAY DEVICE AND METHOD, AND ADVERTISEMENT SERVER

CROSS-REFERENCE TO RELATED APPLICATIONS

This application is a continuation of U.S. application Ser. No. 16/481,570, filed Jul. 29, 2019, now abandoned, which is the U.S. national phase of International Application No. PCT/KR2018/001893, filed Feb. 13, 2018, which designated the U.S. and claims priority to KR Patent Application No. 10-2017-0020199 filed Feb. 14, 2017, the entire contents of each of which are hereby incorporated by reference.

TECHNICAL FIELD

Embodiments disclosed herein relate to a display device and method capable of providing at least one of content and a UI image based on a user input, and an advertisement server.

BACKGROUND ART

A digital broadcasting system may provide a multimedia service through a broadcasting network or an RF network. Unlike a conventional real-time over-the-air broadcasting system, the digital broadcasting system may provide desired content to a user at a desired time.

The digital broadcasting system is capable of bidirectional communication, and therefore, it is possible to provide content corresponding to user preference by monitoring the user's preference.

The conventional digital broadcasting system may monitor user preference based on at least one of user information (region, gender, age, or the like) identified at the time of subscribing a digital broadcasting service or content viewing history.

The digital broadcasting system may provide various services (e.g., providing content according to preferences) suitable for user preference in consideration of user preference.

SUMMARY

Aspects of the disclosure are to address at least the above-mentioned problems and/or disadvantages and to provide at least the advantages described below. Accordingly, an aspect of the disclosure is to provide a display device and method capable of interacting with a user through an input device of high user preference, and an advertisement server.

In accordance with an aspect of the disclosure, a display device includes a display, a communication circuit that communicates with an external electronic device, an interface circuit that receives a user input, and a processor that transmits input device information for the at least one input device to the external electronic device via the communication circuit, receives a first image for interfacing with a user through a most frequently used or most recently used input device among the at least one input device, and overlays the first image on the content, wherein the one input device is the most frequently used input device or the most recently used input device among the identified input devices.

In accordance with another aspect of the disclosure, an advertisement server includes a memory, a communication module that communicates with a display device, a processor that searches for, from the memory, at least one of a first image for allowing the display device to interface with a user through one input device using input device information and advertisement content corresponding to the one input device when the input device information is received from the display device via the communication module, and transmitting the found first image to the display device via the communication module, wherein the processor may identify at least one of a use frequency of each input device connected to the display device, and a latest use order of each input device based on the input device information, and determine the input device to be a most frequently used input device or a most recently used input device as the one input device or identify information on a most frequently used input device or a most recently used input device determined by the display device based on the input device information.

In accordance with another aspect of the disclosure, a display method by a display device may include identifying at least one input device connected to the display device, transmitting input device information on the at least one input device to an external electronic device, receiving a first image for interfacing with a user through a most frequently used input device or a most recently used input device among the at least one input device from the external electronic device, and overlaying and displaying the first image on content being output on the display, wherein the one input device is the most frequently used input device or the most recently used input device among the identified input devices.

According to the embodiments disclosed herein, it is possible to interact with a user through an input device of high user preference.

DETAILED DESCRIPTION OF EXAMPLE EMBODIMENTS

Figure 1:
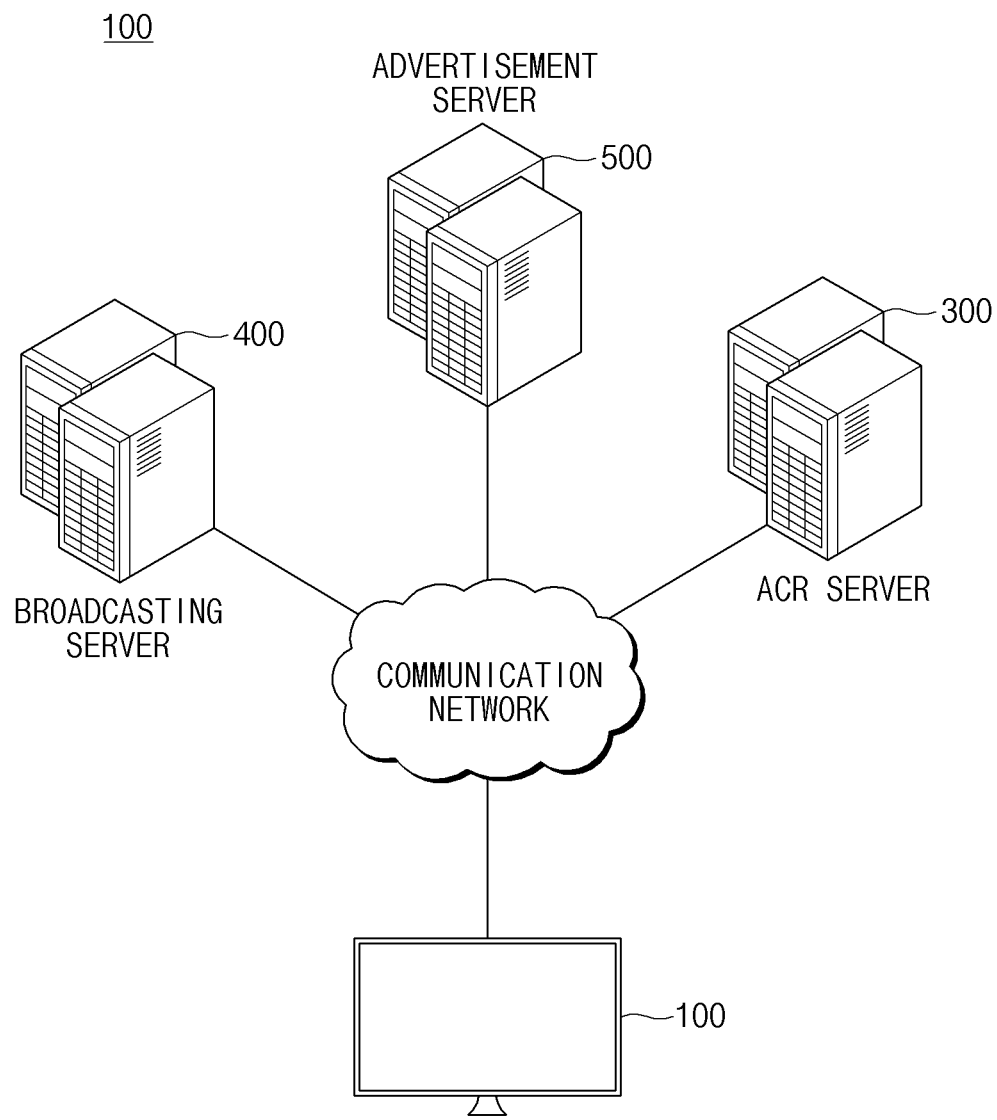
FIG. 1 is a configuration diagram illustrating a broadcasting system according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals. The singular form of a noun corresponding to an item may include one or more items, unless the context clearly dictates otherwise. In the disclosure, the expressions "A or B", "at least one of A or B", "at least one of A and B", "A, B or C", "at least one of A, B and C", or "at least one of A, B, or C" may include all possible combinations of items enumerated with them. The terms such as "first", "second", "primary" or "secondary" may simply be used to distinguish a relevant component from other components and do not limit the relevant component in other aspects (e.g., importance or order). It is to be understood that, when a certain (e.g., first) component may be referred to as being "coupled" or "connected" to another (e.g., second) component, with or without the term "operatively" or "communicationally", it means that the certain component may be connected to the another component directly (e.g., by wire), wirelessly, or via a third component.

FIG. 1 is a configuration diagram illustrating a broadcasting system according to an embodiment.

Referring to FIG. 1, a broadcasting system 1000 may include a broadcasting server 400, an ACR server 300, an advertisement server 500, and a display device 100 according to an embodiment. Although a single display device 100 is shown as an example in FIG. 1 for convenience of description, but the display device 100 may be also a plurality of display devices.

According to one embodiment, the display device 100 may receive and playback broadcast content corresponding to a user input (or a selected channel or requested content) among broadcast content (e.g., broadcast program content, advertisement content, and the like) from the broadcasting server 400. The broadcast content may include, for example, a content (e.g., a broadcast program) image or an advertisement image. The display device 100 may display a broadcast image on a display.

According to one embodiment, the display device 100 may generate image identification information (e.g., a fingerprint, a watermark, or the like of a content image) for the broadcast content from the broadcasting server 400 and transmit the image identification information to the ACR server 300. When information on a replaceable advertisement is received from the ACR server 300, the display device 100 may transmit a replacement advertisement request (a message related to the replacement advertisement request) to the advertisement server 400. The replacement advertisement request may include information necessary for the advertisement server 400 to select a replacement advertisement (replacement advertisement content). For example, the replacement advertisement request may include information on the replaceable advertisement (hereinafter, referred to as replacement advertisement information) (e.g., advertisement playback time or advertisement identification information) and user profile information (e.g., residential area, gender, age, area of interest, or the like).

According to one embodiment, when receiving a replacement advertisement from the advertisement server 500, the display device 100 may output the replacement advertisement instead of the broadcast content from the broadcasting server 400 at the start time of an advertisement according to the replacement advertisement information.

According to one embodiment, the display device 100 may transmit, to the advertisement server 500, input device information for an input device that receives a user input prior to the start time of the advertisement. The display device 100 may receive a first image capable of interfacing with a user through one input device from the advertisement server 500, and overlay and display the first image on the broadcast content or the replacement advertisement.

In the above-described embodiment, the display device 100 may communicate with the broadcasting server 400, the ACR server 300, or the advertisement server 500 via a communication network. The communication network may include at least one of an IP network such as LAN, FTTH, or xDSL, and an RF network such as WiFi, Wibro, 3G, or 4G.

For example, the display device 100 may include at least one of a TV, a monitor, a notebook, a large format display (LFD), a tablet personal computer (PC), an e-book reader, a desktop PC, a laptop PC, a netbook computer, and an electronic photo frame. For example, the display device 100 may include at least one of a smartphone, a mobile phone, a video phone, an MP3 player, a camera, a personal digital assistant (PDA), a portable multimedia player (PMP) and a wearable device.

According to one embodiment, the ACR server 300 may receive image identification information and identify a channel corresponding to the image identification information. For example, the ACR server 300 may include a database that stores image identification information corresponding to each broadcast channel. The ACR server 300 may compare the image identification information received from an ACR module 151 with the image identification information for each broadcast channel stored in the database to identify a channel corresponding to the image identification information.

The ACR server 300 may identify a broadcast schedule of the identified channel (e.g., a broadcast program schedule, or an advertisement schedule). The ACR server 300 may determine whether there is a replaceable advertisement in the identified channel using the broadcast schedules of the plurality of channels stored in the database. The ACR server 300 may identify the replacement advertisement information (e.g., the start time of the advertisement or identification information of the advertisement) when there is the replaceable advertisement in the identified channel. The ACR server 300 may transmit the replacement advertisement information to the display device 100. According to one embodiment, at least some of operations performed by the ACR server 300 may be performed by the display device 100.

According to one embodiment, the broadcasting server 400 may transmit real-time broadcast content to the display device 100. The broadcasting server 400 may transmit broadcast content requested by the display device 100 to the display device 100.

According to one embodiment, the advertisement server 500 may provide a replacement advertisement to the display device 100 at the request of the display device 100. For example, the advertisement server 500 may receive a replacement advertisement request from the display device 100, the replacement advertisement request including at least one of information on a replaceable advertisement and user profile information (e.g., residential area, gender, age, area of interest, or the like). The advertisement server 500 may select a replacement advertisement based on at least one of information on the replaceable advertisement and the user profile information which are included in the replacement advertisement request, and transmit the selected replacement advertisement to the display device 100.

According to one embodiment, when receiving the input device information from the display device 100, the advertisement server 500 may identify or determine one input device based on the input device information. The advertisement server 500 may transmit a first image for allowing the display device 100 to interface with the user through one input device to the display device 100.

Figure 2:
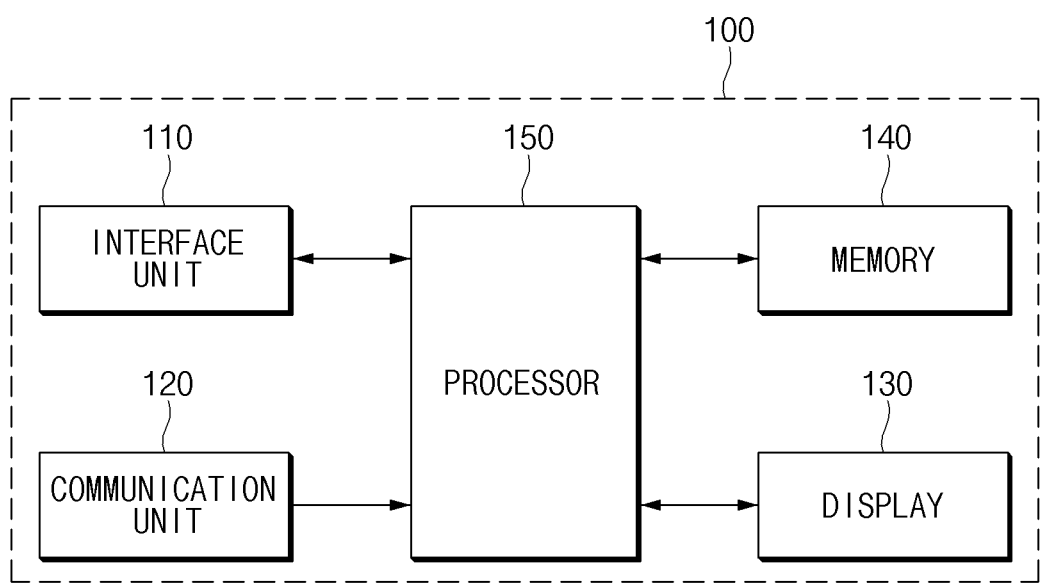
FIG. 2 is a configuration diagram illustrating a display device according to an embodiment.
Figure 3A:
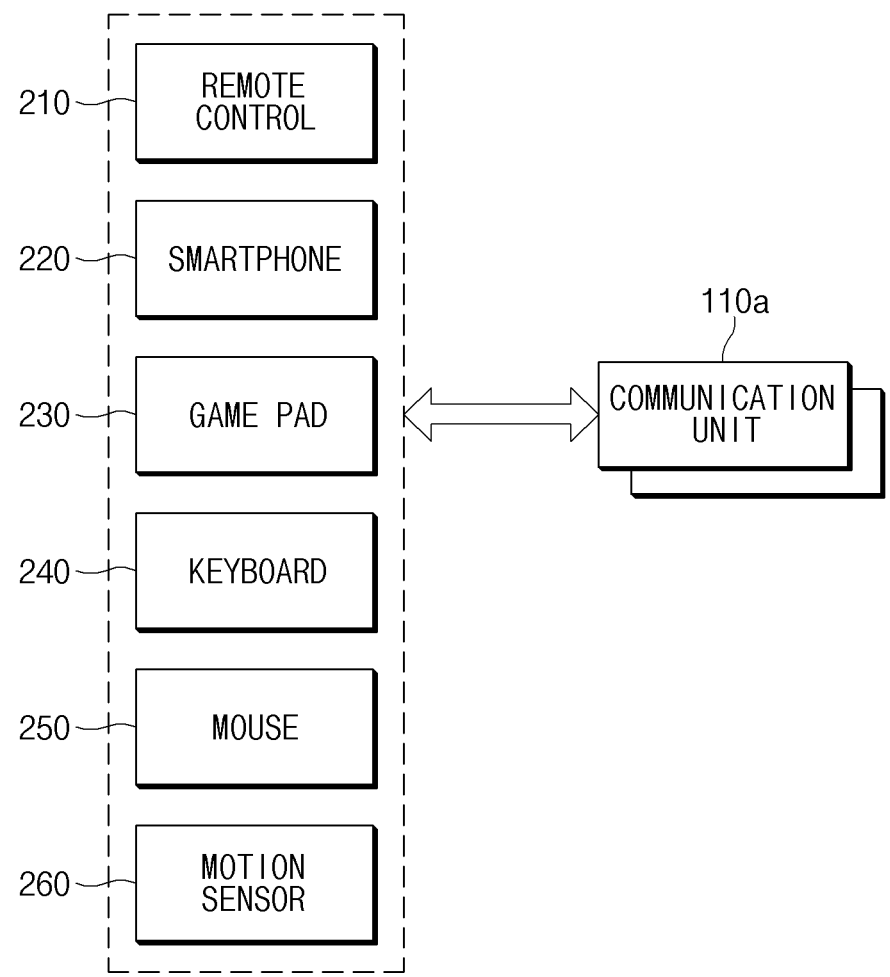
FIGS. 3A and 3B are configuration diagrams illustrating an interface circuit according to an embodiment.
Figure 3B:
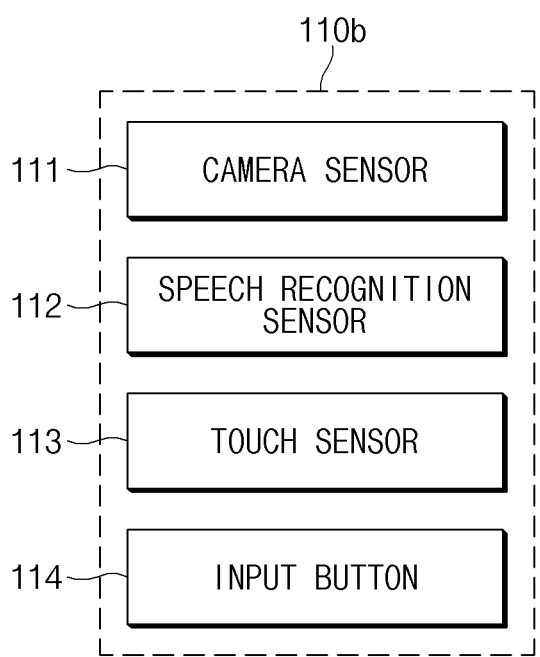

FIG. 2 is a configuration diagram illustrating a display device according to an embodiment. FIGS. 3A and 3B are configuration diagrams illustrating an interface circuit according to an embodiment.

Referring to FIG. 2, the display device 100 may include an interface circuit 110, a communication circuit 120, a display 130, a memory 140, and a processor 150, according to an embodiment. In an embodiment, some components may be omitted, or additional components may be further included. Alternatively, in one embodiment, some of the components may be combined to form a single entity, but the functions of the components prior to the combination may be performed in the same manner. The input/output relationship shown in FIG. 2 is merely an example for convenience of description, and may not be limited thereto.

According to one embodiment, the interface circuit 110 may receive a user input from at least one input device. Referring to FIG. 3A, the interface circuit 110 may include at least one communication unit 110a that communicates with at least one input device. For example, the communication unit 110a may receive a user input from at least one input device such as a remote control 210, a smartphone 220, or a motion sensor 260 in various short-range communication manners such as Bluetooth, infrared communication and Near Field Communication (NFC). Among them, the motion sensor 260 may be an acceleration sensor, a gyro sensor, or the like, and may be used while being held by a user. The motion sensor 260 may be included in the smartphone 220 or the like. As another example, the communication unit 110a may receive a user input from at least one input device such as a game pad 230, a keyboard 240, or a mouse 250 in a wired communication manner such as a USB or a PS2.

According to one embodiment, the interface circuit 110 may include at least one input device and may be at least one input device. In the former case, the interface circuit 110 may be included in the processor 150. Referring to FIG. 3B, the interface circuit 110 may include at least one of a camera sensor 111, a voice recognition sensor 112, a touch sensor 113, and an input button 114, which detect a user input. In this case, the interface circuit 110 may output information corresponding to the user input received from the at least one input device. The information corresponding to the user input may include, for example, an image photographed by the camera sensor 111, voice information detected by the voice recognition sensor 112, touch coordinates detected by the touch sensor 113, operation key information detected by the input button 114, and the like.

Returning back to FIG. 2, according to one embodiment, the communication circuit 120 may communicate with at least one external server. The external server may include at least one of the ACR server 300, a broadcasting server 400, and the advertisement server 500, for example. The communication circuit 120 may communicate with an external server via at least one communication network of a broadcasting network and an RF network. The communication circuit 120 may convert information (e.g., content) received from the communication network into a form that is interpretable by the processor 150. The communication circuit 120 may convert information (e.g., input device information) received from the processor 150 into information capable of being transmitted via the communication network and transmit the information to the communication network.

The display 130 may include, for example, a liquid crystal display (LCD), a light emitting diode (LED) display, an organic light emitting diode (OLED) display, or an electronic paper display. The display 130 may display various content (e.g., text, images, video, icons, and/or symbols) and a first image to be overlaid on the content to the user, for example.

The memory 140 may be a volatile memory (e.g., RAM), a non-volatile memory (e.g., ROM or flash memory), or a combination thereof. The memory 140 may store commands or data related to at least one other component of the display device 100, for example. According to one embodiment, the memory 140 may store instructions for selecting one input device among input devices connected to the interface circuit 110. The memory 140 may store instructions for outputting a replacement advertisement received from the advertisement server 500 instead of broadcast content (e.g., advertisement content) received from the broadcasting server 400. The memory 140 may store instructions for overlaying and displaying the first image on the broadcast content being played back or the replacement advertisement.

The processor 150 may include at least one of, for example, a central processing unit (CPU), a graphics processing unit (GPU), a microprocessor, an application processor, an application specific integrated circuit (ASIC), and field programmable gate arrays (FPGA), and may have a plurality of cores. The processor 150 may perform operations and data processing relating to control and/or communication of at least one other component of the display device 100.

According to one embodiment, the processor 150 may receive and playback broadcast content from the broadcasting server 400. For example, the processor 150 may request broadcast content from the broadcasting server 400 according to a user input through the interface circuit 110, and receive broadcast content from the broadcasting server 400 in response to the request.

According to one embodiment, the processor 150 may communicate with the ACR server 300 and identify the broadcast content being played back or replacement advertisement information. For example, the processor 150 may generate image identification information for an image of the broadcast content being played back, and transmit the generated image identification information to the ACR server 300. The image identification information may be, for example, at least one of a watermark and a fingerprint of a broadcast content image. The ACR server 300 may identify a viewing channel of the display device 100 based on the image identification information and transmit the replacement advertisement information for the replaceable advertisement in the identified channel. Therefore, the processor 150 may identify the replacement advertisement information (e.g., playback time of the advertisement or identification information of the advertisement). In one embodiment, the processor 150 may periodically identify broadcast content or replacement advertisement information, as described above. The processor 150 may perform at least some of operations performed by the ACR server 300.

According to one embodiment, the processor 150 may identify at least one input device connected to the display device 100 or the interface circuit 110 and generate input device information of the identified at least one input device at a time point prior to a replacement advertising time (hereinafter referred to as a first time point) according to the replacement advertisement information. The first time point may be determined based on a time taken to receive and overlay the first image to be overlaid on the broadcast content or the replacement advertisement after transmitting the input device information.

For example, the processor 150 may determine one of the at least one input device at the first time point and generate input device information for the one input device. The input device information may include at least one of, for example, type information of the one input device and list information of the at least one input device. As another example, the processor 150 may generate input device information for at least one input device at the first time point. The input device information may include at least one of list information of at least one input device, use frequency information of each input device, and latest use order information of each input device, for example.

According to one embodiment, the processor 150 may transmit one piece of input device information to the advertisement server 500 and receive a first image for interfacing with the user via the one input device from the advertisement server 500.

As an example, the processor 150 may identify the most frequently used input device from among the at least one input device, and may transmit the input device information of the identified input device to the advertisement server 500. As another example, the processor 150 may identify the most recently used input device from among the at least one input device and may transmit the identified input device information to the advertisement server 500. In this case, the advertisement server 500 may identify a type of the input device identified from the identified input device information, and transmit the first image for interfacing with the user through the identified input device.

According to one embodiment, the processor 150 may transmit input device information for all input devices connected to the interface circuit 110 to the advertisement server 500, and receive the first image corresponding to the one input device selected by the advertisement server 500. In this case, the input device information may include at least one of list information of at least one input device, use frequency information of each input device, and latest use order information of each input device. The advertisement server 500 may select the most frequently used or most recently used input device from among at least one input device corresponding to the list information and transmit a first image corresponding to the selected input device.

According to one embodiment, the processor 150 may display, on the display 130, a replacement advertisement received from the advertisement server 500 instead of the broadcast content received from the broadcasting server 400 at a start time of the advertisement. For example, the processor 150 may request advertisement content to be output before the start time of the advertisement (e.g., the first time point) from the advertisement server 500, and as a result, receive the advertisement content from the advertisement server 500 and display the advertisement content on the display 130 at the start time of the advertisement. In one embodiment, the processor 150 may overlay the first image on the broadcast content or a replacement advertisement and display the first image on the display 130.

According to one embodiment, the processor 150 may change the broadcast content, the replacement advertisement, or the first image based on the user input received from the one input device and display the same on the display 130. In this process, the processor 150 may transmit interface information for the one input device to the advertisement server 500. In this case, the advertisement server 500 may provide the broadcast content, the replacement advertisement, or the first image, which has been changed based on the interface information, to the display device 100.

According to one embodiment, the processor 150 may determine the completion of viewing at least one of the first image and the replacement advertisement based on a user input via the one input device. For example, the processor 150 may determine the completion of viewing at least one of the first image and the replacement advertisement when determining that at least one object included in the first image is selected through the one input device.

According to one embodiment, when the completion of the viewing is determined, the processor 150 may transmit the interface information notifying that the viewing has been completed, to the advertisement server 500 via the communication circuit 120, or receive reward information for the viewing completion from the advertisement server 500 via the communication circuit 120.

In this regard, in one embodiment, it is possible to interact with a user when providing the advertisement content or the first image for advertisement, thereby increasing the user's interest in the advertisement.

Figure 4:
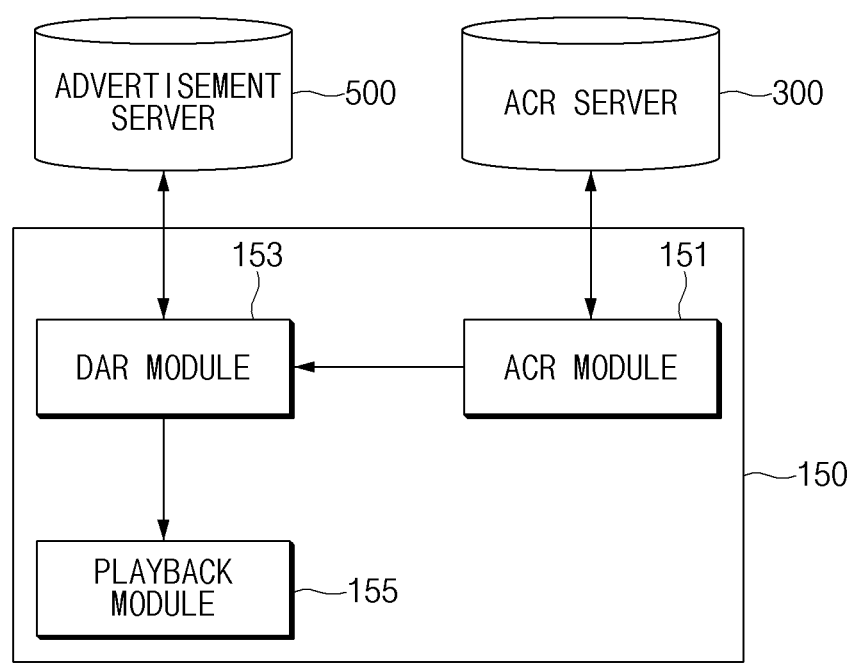
FIG. 4 is a diagram illustrating a program module included in a display device according to an embodiment.

FIG. 4 is a diagram illustrating a program module included in a display device according to an embodiment;

Referring to FIG. 4, program modules (e.g., an application) included in the display device 100 may include the ACR module 151, a DAR module 153, and a playback module 155. The program modules may be stored in the memory 120. The program modules may be executed by the processor 150 to perform respective operations.

The ACR module 151 may generate image identification information based on an image displayed on the display 130. For example, the ACR module 151 may capture an image displayed on the display 130 and generate image identification information (fingerprint information or watermark information) using the captured image. For example, the ACR module 151 may generate fingerprint information by reducing the captured image and extracting features representative of the captured image. In another example, the ACR module 151 may extract watermark embedded in the captured image to generate watermark information. According to one embodiment, the ACR module 151 may transmit image identification information to the ACR server 300.

The ACR server 300 can receive the image identification information and identify a channel corresponding to the image identification information. For example, the ACR server 300 may include a database that stores image identification information corresponding to each broadcast channel. The ACR server 300 may compare the image identification information received from the ACR module 151 with the image identification information for each broadcast channel stored in the database to identify a channel corresponding to the image identification information.

The ACR server 300 may identify a broadcast schedule of the channel (e.g., a broadcast program schedule, or an advertisement schedule) corresponding to identified channel information. For example, the ACR server 300 may determine whether a replaceable advertisement is included in a channel corresponding to the channel information using broadcast schedules of the plurality of channels stored in database. The ACR server 300 may identify information on the replaceable advertisement (e.g., a start time of the advertisement or identification information of the advertisement) when the replaceable advertisement is included in the channel corresponding to the channel information. The ACR server 300 may transmit the information on the replaceable advertisement to the display device 100. According to one embodiment, at least some of the operations performed by the ACR server 300 may be performed by the ACR module 151.

According to one embodiment, the DAR module 153 may transmit a replacement advertisement request to the advertisement server 400 when the information on the replaceable advertisement is received from the ACR server 300. The replacement advertisement request may include information necessary for the advertisement server 400 to select a replacement advertisement. For example, the replacement advertisement request may include information on the replaceable advertisement and user profile information (e.g., residential area, gender, age, area of interest, or the like).

According to one embodiment, the advertisement server 400 may transmit a replacement advertisement (or a replacement advertisement image) to the display device 100 in response to the request from the DAR module 153. The advertisement server 500 may select a replacement advertisement based on at least one of information on a replaceable advertisement included in the replacement advertisement request and the user profile information and transmit the selected replacement advertisement to the display device 100.

According to one embodiment, the playback module 155 may playback and output the replacement advertisement and the first image received from the advertisement server 400. According to one embodiment, the playback module 155 may display the replacement advertisement image and the first image on the display 130. For example, the playback module 155 may replace a broadcast image from the broadcasting server 400 with a replacement advertisement image and display it on the display 130. According to one embodiment, the playback module 155 may output an audio signal included in the replacement advertisement via a speaker (not shown) in synchronization with the replacement advertisement image.

Figure 5:
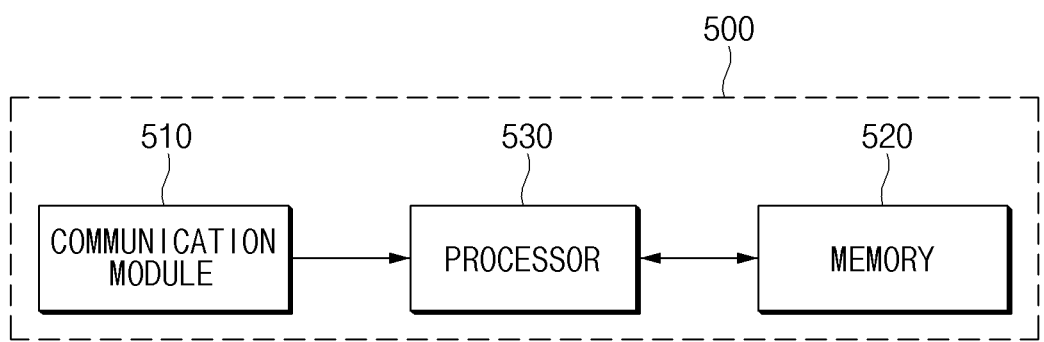
FIG. 5 is a configuration diagram illustrating an advertisement server according to an embodiment.

FIG. 5 is a configuration diagram illustrating an advertisement server according to an embodiment;

Referring to FIG. 5, the advertisement server 500 may include a communication module 510, a memory 520, and a processor 530, according to one embodiment. In one embodiment, some components may be omitted, or additional components may be further included. Alternatively, in one embodiment, some of components may be combined to form a single entity, but the functions of the components prior to the combination may be performed in the same manner. The input/output relationship shown in FIG. 5 is only an example for convenience of description, and may not be limited thereto.

According to one embodiment, the communication module 510 may convert a signal (e.g., input device information) received from the display device 100 into a form that is interpretable by the processor 530, and convert a signal (e.g., advertisement content) from the processor 530 into a signal capable of being transmitted over a communication network to transmit the signal to the communication network.

According to one embodiment, the memory 520 may be a volatile memory (e.g., RAM), a non-volatile memory (e.g., ROM or flash memory), or a combination thereof. The memory 520 may, for example, store commands or data related to at least one other component of the advertisement server 500. According to one embodiment, the memory 520 may store advertisement content for each broadcast time period according to a broadcast channel. The memory 520 may store a first image associated with each advertisement content.

According to one embodiment, the memory 520 may store the advertisement content and the first image for each input device. The advertisement content for each input device may be advertisement content corresponding to at least one of a tendency and an area of interest of a user who uses each input device.

For example, a user with a high use frequency of the game pad 330 may be likely to like games and have an early adapter tendency, so that the advertisement content corresponding to the game pad may be game content, a game machine, the latest electronic device, or relatively recent trendy content. As another example, a user with a high frequency of use of the camera sensor 211 may be likely to be interested in appearance, and therefore, the advertisement content corresponding to the camera sensor 211 may be related to fashion (e.g., cosmetics, clothes, or the like). As still another example, a user with a high frequency of use of the motion sensor 360 may be likely to have an active tendency, and therefore, the advertisement content corresponding to the motion sensor 360 may be related to items necessary for outdoor activities. The advertisement content corresponding to the input device according to the above-described example may be determined through analysis of at least one of the user's tendency and the area of interest of the user according to the input device.

The processor 530 may include at least one of, for example, a central processing unit (CPU), a graphics processing unit (GPU), a microprocessor, an application processor, an application specific integrated circuit (ASIC), and field programmable gate arrays (FPGA), and may have a plurality of cores. The processor 530 may execute operations and data processing related to control and/or communication of at least one other component of the advertisement server 500.

According to one embodiment, when receiving input device information, the processor 530 may determine an input device using the input device information. For example, the input device information may include at least one of input device list information, use frequency information of each input device, and latest use order information of each input device. In this case, the processor 530 may determine the most frequently used or most recently used input device among input devices corresponding to the input device list information as an input device that provides an interface between the display device 100 and the user. In another example, when receiving input device information including one piece of input device information from the display device 100, the processor 530 may not determine the input device separately.

According to one embodiment, the processor 530 may search for at least one of a replacement advertisement and a first image corresponding to one input device from the memory 520 and transmit it to the display device 100 via the communication module 510.

According to one embodiment, when identifying selection of one of objects included in the first image via the communication module 510, the processor 530 may change at least one of the advertisement content and the first image based on the selected object and transmit at least one of the updated advertisement content and the updated first image to the display device 100 via the communication module 510.

According to one embodiment, the processor 530 may determine whether the user has viewed at least one of the first image and the advertisement content based on the interface information for the first image transmitted by the display device 100. For example, the processor 530 may determine whether the user has viewed the advertisement content by identifying the selection of a specified object included in the first image based on the interface information.

According to one embodiment, the processor 530 may transmit reward information to the display device 100 via the communication module 510 when determining that the user has viewed the advertisement content. For example, the reward information may be a discount coupon, a point, or the like.

According to one embodiment, the processor 530 may transmit reward information including a first object to the display device 100. When receiving the interface information indicating that the user using one input device has selected the first object, from the display device 100 via the communication module 510, the processor 530 may also transmit the reward information to an external electronic device (not shown) based on the interface information. The external electronic device (not shown) may be a portable device of the user, such as a smartphone, a portable terminal, a smart pad, an iPad, and the like.

Thus, in one embodiment, it is possible to provide advertisement content in a form allowing the user to increase the immersion and interest in the advertisement.

Figure 6A:
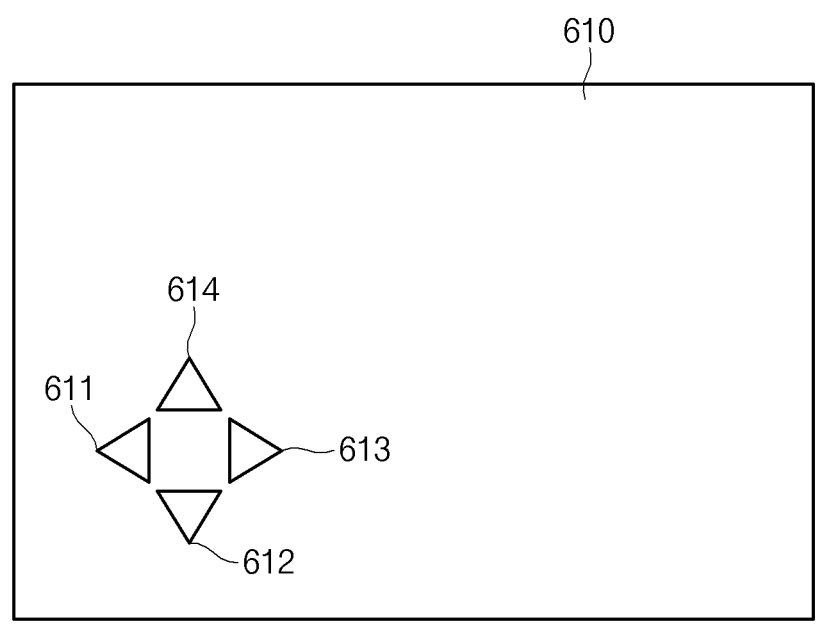
FIGS. 6A and 6B are exemplary diagrams of a first image corresponding to an input device having a plurality of direction keys according to an embodiment.
Figure 6B:
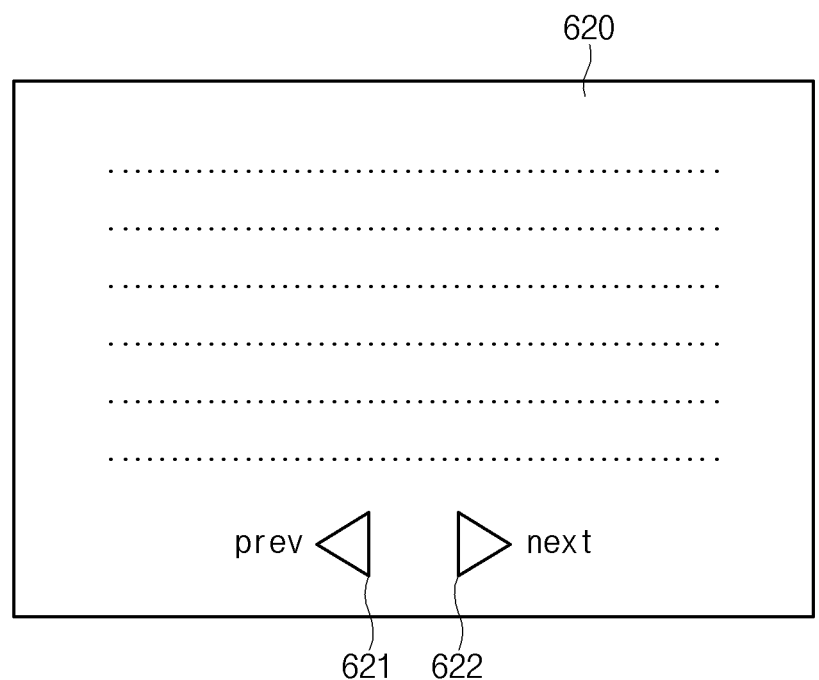
Figure 6C:
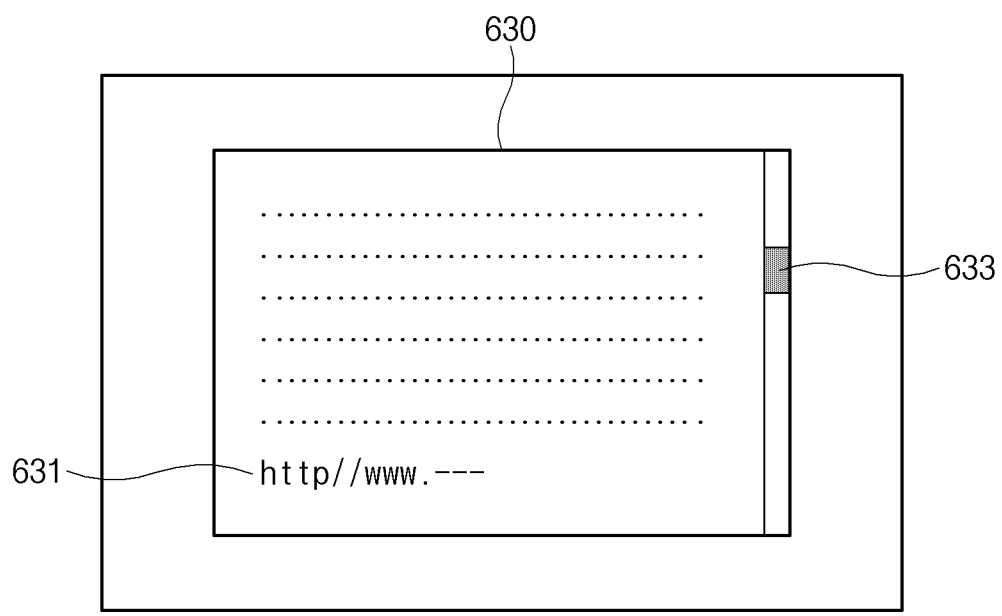
FIG. 6C is an exemplary diagram of a first image corresponding to a mouse according to an embodiment.
Figure 6D:
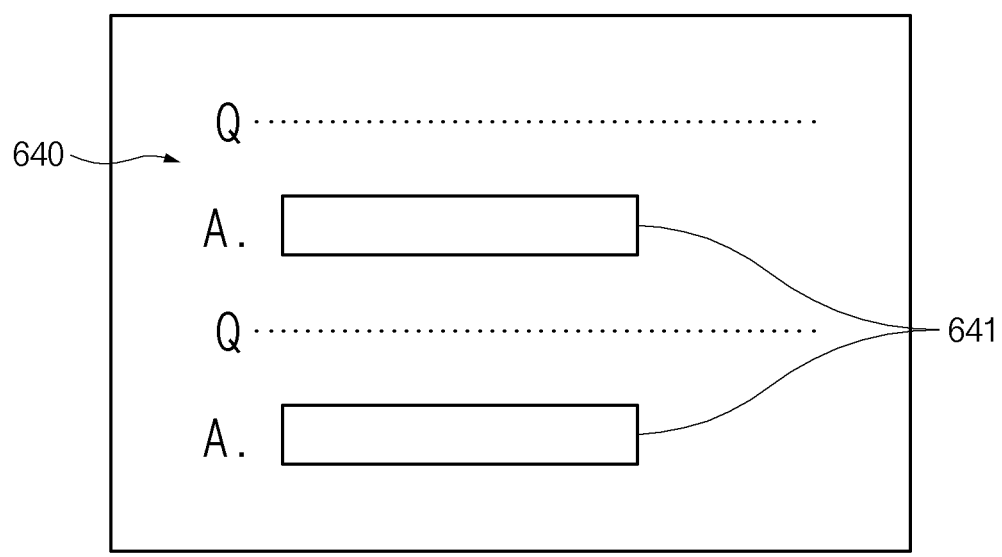
FIG. 6D is an exemplary diagram of a first image corresponding to a keyboard according to an embodiment.

FIGS. 6A to 6D are exemplary diagrams of a first image displayed on a display according to an embodiment. FIGS. 6A and 6B are exemplary diagrams of a first image corresponding to an input device having a plurality of direction keys according to an embodiment; FIG. 6C is an exemplary diagram of a first image corresponding to a mouse according to an embodiment; FIG. 6D is an exemplary diagram of a first image corresponding to a keyboard according to an embodiment;

Referring to FIG. 6A, a first image corresponding to an input device having four directional keys may include four objects 611, 612, 613, and 614 corresponding to four directional keys, respectively. The input device having the four directional keys may include at least one of a game pad, a remote control, and a smartphone. A replacement advertisement 610 on which the first image including the four objects 611, 612, 613, and 614 is overlaid may be simple game-type content that is executable by operating the four directional keys, for example. In the example of FIG. 6A, the advertisement server 500 may provide a demo of a new game to the display device 100 via the replacement advertisement 610. Unlike FIG. 6A, the first image may be an object moving in a direction corresponding to operation of the four directional keys of the input device.

Referring to FIG. 6B, a first image corresponding to an input device having two directional keys may include two objects 621 and 622 corresponding to the two directional keys. A replacement advertisement 620 on which the first image is overlaid may be still image type content (e.g., text content) that is switchable to a previous screen or a next screen by operating the two directional keys. In the example of FIG. 6B, the advertisement server 500 may promote an off-line event through the replacement advertisement 620, and provide discount information of the off-line event to the display device 100 when the viewing of the replacement advertisement 620 is completed.

Referring to FIG. 6C, a first image corresponding to a mouse may include one of a first object 631 to a third object 633 corresponding to a left click, a right click, and a scroll key. A replacement advertisement 630 on which the first image is overlaid may be, for example, still image type content in which screens are switchable according to the operation of the mouse. In the example of FIG. 6C, the advertisement server 500 may promote an on-line event through the replacement advertisement 630, and provide discount information of the on-line event when it is determined that the hyperlink of the replacement advertisement 630 is left-clicked by the mouse.

Referring to FIG. 6D, a first image corresponding to a keyboard may include an input field object 641 for receiving and displaying contents input by the keyboard. A replacement advertisement 640 on which the first image is overlaid may be, for example, still image type content in which contents may be input by the keyboard. In the example of FIG. 6D, when the advertisement server 500 receives a correct response to a query for determining whether an advertisement has been viewed from the display device 100 after providing the replacement advertisement 640, the advertisement server 500 may provide predetermined reward information to the user via the display device 100.

The description has been given with respect to FIGS. 6A to 6D, by taking, as an example, a case where both the replacement advertisement and the first image correspond to one input device used for the interface between the display device 100 and the user. In another embodiment, one of the replacement advertisement and the first image may correspond to one input device. For example, the advertisement server 500 may transmit a replacement advertisement or a first image corresponding to one input device, and the display device 100 may receive the replacement advertisement or the first image to display the replacement advertisement or the first image. As described above, in one embodiment, the user interface type advertisement content may be provided, thereby increasing the user's interest in the advertisement content and enhancing the advertisement effect.

Figure 7:
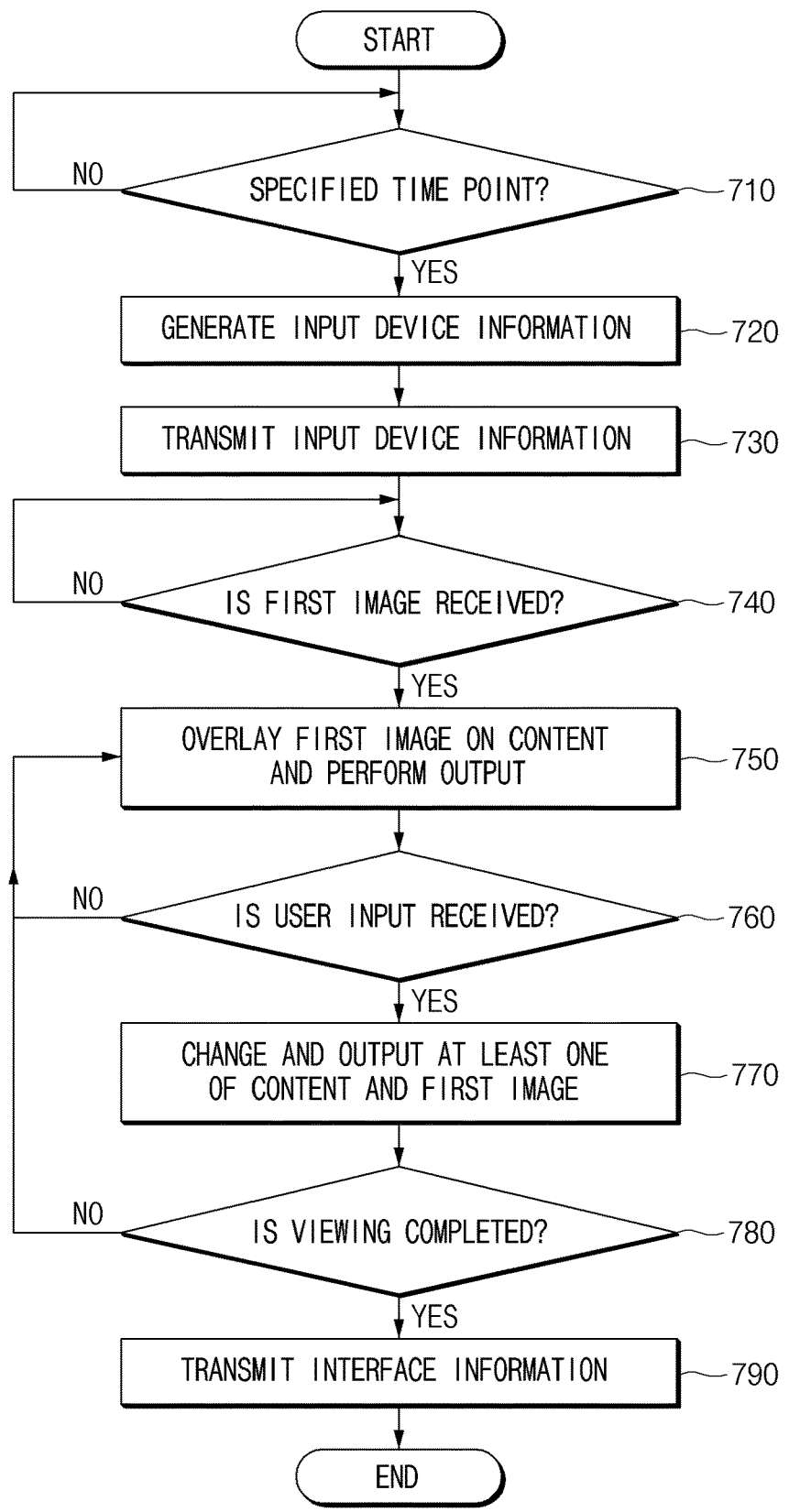
FIG. 7 is a flowchart of a method of providing a first image corresponding to an input device by a display device according to an embodiment.

FIG. 7 is a flowchart of a method of providing a first image corresponding to an input device by a display device according to an embodiment.

Referring to FIG. 7, in operation 710, the display device 100 may identify whether a current time point is a specified time point (first time point) while playing back the broadcast content. The specified time point may be a time point preceding a start time of the advertisement, at which a replacement advertisement is output from the advertisement server 500 instead of the broadcast content from the advertisement server 500, by a specified time.

In operation 720, when a specified time point is reached, the display device 100 may generate input device information. For example, the display device 100 may generate input device information for all input devices connected to the display device 100. In this case, the input device information may include at least one of input device list information of at least one input device, use frequency information and latest use order information of each input device. As another example, the display device 100 may select the most frequently used input device or the most recently used one input device among all the input devices connected to the display device 100, and generate input device information for the selected input device. The input device information for the selected input device may include at least one of type information of the selected input device and list information of all connected input devices.

In operation 730, the display device 100 may transmit the input device information to the advertisement server 500 via a communication network. When receiving the input device information, the advertisement server 500 may determine a first image to be transmitted to the display device 100 based on the input device information. The advertisement server 500 may determine advertisement content to be transmitted to the display device 100 based on the input device information.

In operation 740, the display device 100 may determine whether a first image corresponding to one input device is received from the advertisement server 500 after transmitting the input device information. In operation 740, the display device 100 may additionally determine whether advertisement content is received from the advertisement server 500.

In operation 750, when the first image is received, the display device 100 may overlay and display the first image on broadcast content displayed on the display 130. In operation 750, when receiving a replacement advertisement from the advertisement server 500, the display device 100 may display the replacement advertisement on the display 130, and may also overlay and display the first image on the replacement advertisement.

In operation 760, the display device 100 may determine whether a user input is received via the one input device while displaying at least one of the first image and the replacement advertisement on the display 130.

In operation 770, when the user input is received via the one input device, the display device 100 may change at least one of the first image and the replacement advertisement in response to the user input to display the same on the display 130. An algorithm by which the display device 100 changes at least one of the first image and content (replacement advertisement) corresponding to the user input, or the like may be provided from the advertisement server 500. The display device 100 may transmit the user input to the advertisement server 500 and may receive and display at least one of the first image and the content (replacement advertisement) changed by the advertisement server 500 on the display 130.

In operation 780, the display device 100 may determine whether a user has viewed the first image (or advertisement content) based on user interface information for the first image.

In operation 790, when determining that the viewing of the first image (or the advertisement content) is completed, the display device 100 may transmit the interface information for the first image to the advertisement server 500. The interface information may include information on an object selected through the one input device among at least one object included in the first image. In the above-described embodiment, the display device 100 may transmit interface information each time one of objects included in the first image is selected through the one input device. In this regard, in one embodiment, it is possible to interact with a user when providing the advertisement content or the first image for advertisement, thereby increasing the user's interest in the advertisement.

Figure 8:
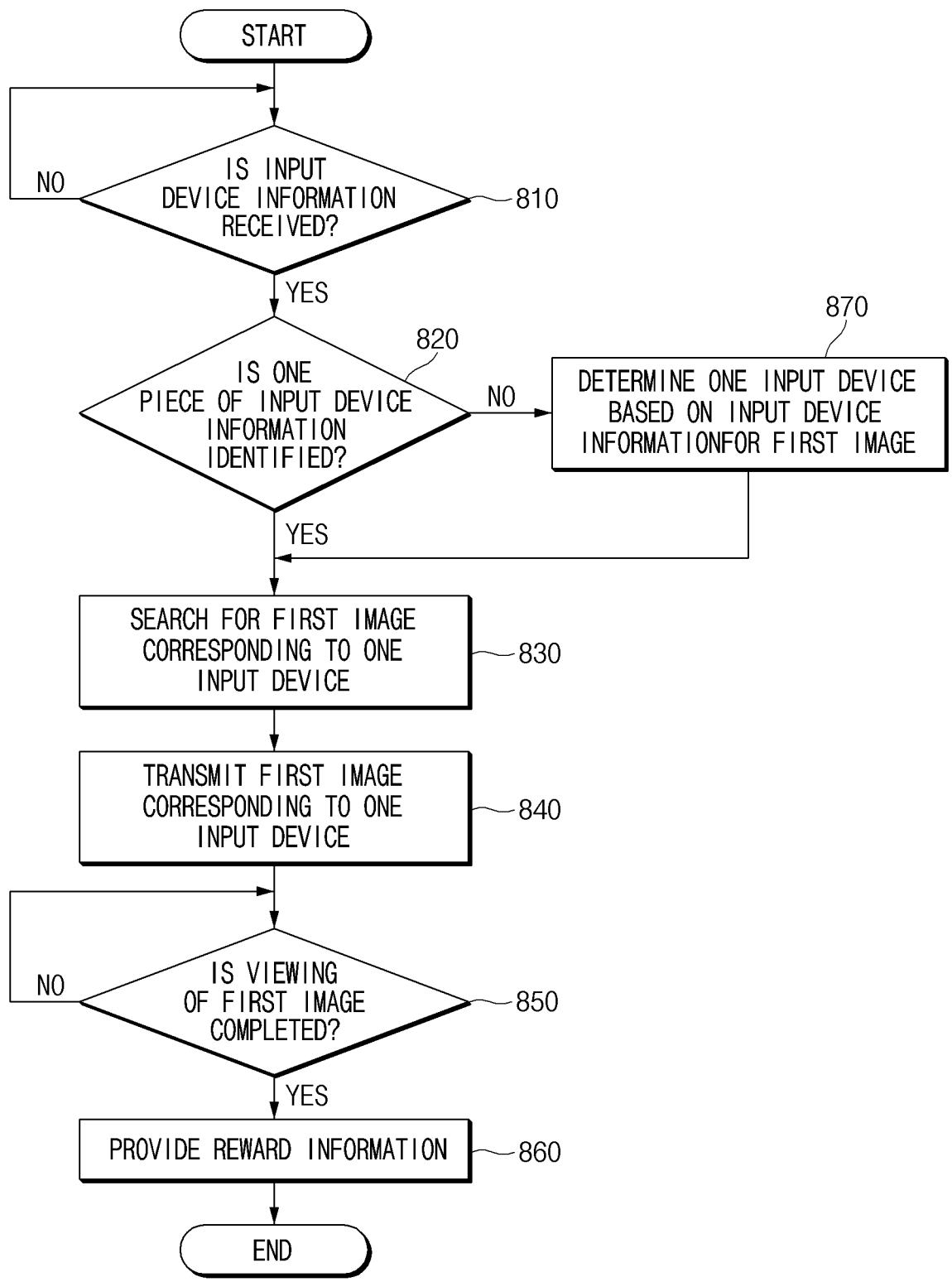
FIG. 8 is a flowchart of a method of providing a first image corresponding to an input device by an advertisement server according to an embodiment.

FIG. 8 is a flowchart of a method of providing a first image corresponding to an input device by an advertisement server according to an embodiment.

Referring to FIG. 8, in operation 810, the advertisement server 500 may determine whether input device information is received via a communication network.

In operation 820, when the input device information is received, the advertisement server 500 may identify one piece of input device information (e.g., type information of one input device) from the input device information.

In operation 830, the advertisement server 500 may search for a first image corresponding to the one input device from the memory 520, when it is possible to identify one piece of input device information. The first image corresponding to the one input device may be an image that supports the display device 100 to interface with the user through the one input device.

In operation 840, the advertisement server 500 may transmit the first image corresponding to the found one input device to the display device 100 through the communication network.

In operation 850, the advertisement server 500 may monitor whether viewing of the first image (or advertisement content) through the display device 100 has been completed based on interface information from the display device 100. The interface information may be information generated (or identified) as the display device 100 interfaces with the user through one input device. For example, the interface information may include selection information for at least one object among objects included in the first image.

In operation 860, when it is determined that the viewing of the first image (or advertisement content) through the display device 100 has been completed, the advertisement server 500 may provide reward information to the display device 100 or an external electronic device. For example, the reward information may be a discount coupon, a point, or the like.

Thus, in one embodiment, it is possible to provide advertisement content in a form allowing a viewer to increase the immersion and interest in the advertisement.

According to one embodiment, a display device (e.g., 100 of FIG. 2) may include a display (e.g., 130 of FIG. 2), a communication circuit (e.g., 120 of FIG. 2) that communicates with an external electronic device (e.g., 400 of FIG. 1), an interface circuit (e.g., 110 of FIG. 2) that receives a user input, and a processor (e.g., 150 of FIG. 2) operatively connected to the communication circuit and the interface circuit to allow the display to display content, and wherein the processor may identify at least one input device connected to the interface circuit, transmit input device information on the at least one input device to the external electronic device via the communication circuit, receive a first image for interfacing with a user through an input device most frequently used or most recently used among the at least one input device, and overlay the first image on the content and output the content to the display.

The processor may change the content or the first image based on a user input received from the one input device and display the content or the first image on the display.

The processor may identify the one input device most frequently used among the at least one input device, transmit input device information on the one input device to the external electronic device, and receive the first image from the external electronic device.

The processor may identify the one input device most recently used among the at least one input device, transmit input device information on the one input device to the external electronic device, and receive the first image from the external electronic device.

The input device information may include at least one of use frequency information, latest use order information, and list information of the at least one input device, and the processor may receive the first image corresponding to a most frequently used or most recently used input device determined based on at least one of the use frequency information, the latest use order information, and the list information by the external electronic device.

The processor may receive content determined based on the input device information by the external electronic device from the external electronic device, and display the received content on the display.

The content may include broadcast content received from the external electronic device via the communication circuit, and replacement advertisement content received from another external electronic device via the communication circuit, and the processor may overlay the first image on a replacement advertisement when displaying the replacement advertisement content instead of the broadcast content.

According to an embodiment, a server device (e.g., 500 of FIG. 5) may include a communication circuit (e.g., 510 of FIG. 5) that communicates with a display device (e.g., 100 of FIG. 2), a processor (e.g., 530 of FIG. 5) electrically connected to the communication circuit, and a memory (e.g., 520 of FIG. 5) electrically connected to the processor, wherein the memory may store at least one instruction causing, when being executed, the processor to identify one input device most frequently used or most recently used among at least one input device connected to the display device from input device information when the input device information is received from the display device via the communication circuit, search for advertisement content corresponding to the one input device and a first image for interfacing with a user through the one input device from the memory, and transmit the found advertisement content and the found first image to the display device via the communication circuit.

The memory may further store instructions causing, when being executed, the processor to identify at least one of an input device list, a use frequency of each input device, and a latest use order of each input device based on the input device information, and determine the one input device to be a most frequently used input device or a most recently used input device among the at least one input device included in the input device list.

The advertisement content may include replacement advertisement content to be output instead of broadcast content by the display device, and the memory may further store a plurality of replacement advertisements corresponding to a plurality of input devices and instructions causing, when being executed, the processor to search for a replacement advertisement corresponding to the one input device among the plurality of replacement advertisements corresponding to the plurality of input devices from the memory.

The memory may further store instructions causing, when being executed, the processor to provide reward information to the display device or an external electronic device corresponding to the display device when interface information indicating that viewing of at least one of the first image and the advertisement content has been completed is received from the display device.

According to an embodiment, a display method by a display device (e.g., 100 of FIG. 2) may include identifying at least one input device connected to the display device, transmitting input device information on the at least one input device to an external electronic device, receiving a first image for interfacing with a user through a most frequently used input device or a most recently used input device among the at least one input device from the external electronic device, and overlaying and outputting the first image on content being output on the display.

According to an embodiment, the display method may further include changing and displaying at least one of the content or the first image based on a user input received from the one input device.

According to an embodiment, the display method may further include identifying the one input device most frequently used among the at least one input device, and the transmitting of the input device information may include transmitting input device information on the one input device to the external electronic device.

According to an embodiment, the display method may further include identifying the one input device most recently used among the at least one input device, and the transmitting of the input device information includes transmitting input device information on the one input device to the external electronic device.

The input device information may include at least one of use frequency information, latest use order information, and list information of the at least one input device, and the receiving of the first image may include receiving the first image corresponding to a most frequently used or most recently used input device determined based on at least one of the use frequency information, the latest use order information, and the list information by the external electronic device.

According to an embodiment, the display method may further include receiving the content determined based on the input device information by the external electronic device and displaying the received content on the display.

The content may include broadcast content received from the external electronic device, and replacement advertisement content received from another external electronic device, and the outputting of the first image may include overlaying the first image on the replacement advertisement content when the replacement advertisement content is displayed instead of the broadcast content.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an inner memory, or the like. The instruction may contain a code generated by a compiler or a code executable by an interpreter. A module or a program module according to various embodiments may include at least one of the above components, or a part of the above components may be omitted, or additional other components may be further included.

Operations performed by a module, a program module, or other components according to various embodiments may be executed sequentially, in parallel, repeatedly, or in a heuristic method. In addition, some operations may be executed in different sequences or may be omitted. Alternatively, other operations may be added. In addition, the embodiments disclosed herein are suggested for the purpose of explanation and understanding of the disclosed technology and do not limit the scope of the technology described in the disclosure. Therefore, the scope of the disclosure should be interpreted to include all modifications and various other embodiments based on the technical idea of the disclosure.

What is claimed is:
1. A display device comprising:
a display;
a communication circuit configured to communicate with an external electronic device;

an interface circuit configured to receive a user input; and
a processor operatively connected to the display, the communication circuit and the interface circuit;
wherein the processor is configured to:
control the display to display first content received from the external electronic device, and
when a playback time of second content to be received from the external electronic device is identified, control the display to display, at the playback time, the second content received from the external electronic device instead of the first content,
wherein the processor is further configured to:
identify, before the playback time, a type of at least one input device connected to the interface circuit,
determine whether the second content is associated with the type of at least one input device,
based on the second content being determined to be associated with the type of at least one input device, control the display to display, at the playback time, the second content received from the external electronic device, and
based on the first content not being determined to be associated with the type of at least one input device, control the display to display, at the playback time, third content received from the external electronic device instead of the second content,
wherein the third content is associated with the type of at least one input device.

2. The display device of claim 1, wherein the external electronic device stores at least one replacement content, and
wherein the processor is further configured to determine, as the third content, replacement content associated with the type of at least one input device from among at least one replacement content stored in the external electronic, and
receive the third content from the external electronic device.

3. The display device of claim 2, wherein the processor is further configured to identify user profile information and determine the replacement content based on the type of at least one input device and the user profile information,
wherein the user profile information comprises at least one of information indicating a residential area, information indicating a gender, information indicating an age or information indicating an area of interest.

4. The display device of claim 1, wherein the processor is further configured to provide information associated with the type of at least one input device to the external electronic device and receive the third content corresponding to the type of at least one input device from the external electronic device.

5. The display device of claim 4, wherein the processor is further configured to provide user profile information to the external electronic device and receive the third content corresponding to the user profile information from the external electronic device,
wherein the user profile information comprises at least one of information indicating a residential area, information indicating a gender, information indicating an age or information indicating an area of interest.

6. The display device of claim 1, wherein the processor is further configured to identify the playback time of the second content based on information provided from the external electronic device.

7. The display device of claim 1, wherein the second content comprises at least one of a broadcast program content or an advertisement content.

8. The display device of claim 1, wherein the third content is determined based on at least one of use frequency or latest use order of each of the at least one input device.

9. A method of a display device, the method comprising:
displaying first content received from an external electronic device; and
when a playback time of second content to be received from the external electronic device is identified, displaying, at the playback time, the second content received from the external electronic device instead of the first content;
wherein the method further comprises:
in response to identifying the playback time, identifying, before the playback time, a type of at least one input device connected to the display device;
determining whether the second content is associated with the type of at least one input device;
based on the second content being determined to be associated with the type of at least one input device, displaying, at the playback time, the second content received from the external electronic device; and
based on the second content not being determined to be associated with the type of at least one input device, displaying, at the playback time, third content received from the external electronic device instead of the second content,
wherein the third content is associated with the type of at least one input device.

10. The method of claim 9, further comprising:
determining, as the third content, replacement content associated with the type of at least one input device from among at least one replacement content stored in the external electronic, and
receiving the third content from the external electronic device.

11. The method of claim 10, further comprising:
identifying user profile information and determining the replacement content based on the type of at least one input device and the user profile information,
wherein the user profile information comprises at least one of information indicating a residential area, information indicating a gender, information indicating an age or information indicating an area of interest.

12. The method of claim 9, further comprising:
providing information associated with the type of at least one input device to the external electronic device; and
receiving the third content corresponding to the type of at least one input device from the external electronic device.

13. The method of claim 12, further comprising:
providing user profile information to the external electronic device; and
receiving the third content corresponding to the user profile information from the external electronic device,
wherein the user profile information comprises at least one of information indicating a residential area, information indicating a gender, information indicating an age or information indicating an area of interest.

14. The method of claim 9, further comprising:
identifying the playback time of the second content based on information provided from the external electronic device.

15. The method of claim 9, wherein the second content comprises at least one of a broadcast program content or an advertisement content.

16. The method of claim 11, wherein the third content is determined based on at least one of use frequency or latest use order of each of the at least one input device.

\* \* \* \* \*